United States Patent
Otxoa-Aizpurua Calvo et al.

(10) Patent No.: US 11,344,037 B2
(45) Date of Patent: May 31, 2022

(54) VERTICAL PACKAGING MACHINE FOR PACKAGING PRODUCTS AND ASSOCIATED METHOD

(71) Applicant: ULMA Packaging Technological Center, S. Coop., Oñati (ES)

(72) Inventors: Alberto Otxoa-Aizpurua Calvo, Oñati (ES); Oier Olalde Arregui, Oñati (ES)

(73) Assignee: ULMA Packaging Technological Center, S. Coop., Oñati (ES)

( * ) Notice: Subject to any disclaimer, the term of this patent is extended or adjusted under 35 U.S.C. 154(b) by 290 days.

(21) Appl. No.: 16/281,481

(22) Filed: Feb. 21, 2019

(65) Prior Publication Data

US 2019/0254296 A1     Aug. 22, 2019

(30) Foreign Application Priority Data

Feb. 21, 2018 (EP) .................................... 18382103

(51) Int. Cl.
    *B65B 31/04*          (2006.01)
    *A22C 25/14*          (2006.01)
                 (Continued)

(52) U.S. Cl.
    CPC ............. *A22C 25/145* (2013.01); *B65B 9/20* (2013.01); *B65B 31/045* (2013.01); *B65B 37/02* (2013.01); *B65B 31/043* (2013.01)

(58) Field of Classification Search
    USPC ....................................................... 53/139.1
    See application file for complete search history.

(56) References Cited

U.S. PATENT DOCUMENTS

| 3,789,888 A | * | 2/1974 | James | ..................... B65B 9/213 |
| | | | | 141/4 |
| 6,116,001 A | * | 9/2000 | Kammler | ................ B65B 37/14 |
| | | | | 141/67 |

(Continued)

FOREIGN PATENT DOCUMENTS

| DE | 7229123 U | 11/1972 |
| FR | 2531036 A1 | 2/1984 |
| GB | 2124575 B | 2/1984 |

OTHER PUBLICATIONS

Extended European Search Report in corresponing EP Application No. 18382103.2, dated Jul. 17, 2018, 7 pages.

*Primary Examiner* — Anna K Kinsaul
*Assistant Examiner* — Chinyere J Rushing-Tucker
(74) *Attorney, Agent, or Firm* — Edell, Shapiro & Finnan, LLC

(57) ABSTRACT

A vertical packaging machine for packaging products is provided that includes a forming element with an upper mouth and a hopper upstream of the forming element. At least the hopper and the forming element form a conduit through which the product falls. A flow generator includes an injection device for injecting a gaseous fluid through a distributor for directing the fluid to the conduit. The distributer has an inlet mouth for receiving the gaseous fluid and an outlet mouth with an area smaller than the area of the inlet mouth. The injection device is controlled by a control device that is configured to cause the injection device to perform an injection for each product to be packaged in one and the same package, the start and end of which depend on the position of the product with respect to the upper mouth and the outlet mouth.

19 Claims, 4 Drawing Sheets

(51) Int. Cl.
 *B65B 9/20* (2012.01)
 *B65B 37/02* (2006.01)

(56) References Cited

U.S. PATENT DOCUMENTS

| | | | | |
|---|---|---|---|---|
| 6,179,015 | B1 * | 1/2001 | Kammler | B65B 9/20 |
| | | | | 141/4 |
| 2005/0172582 | A1 * | 8/2005 | Taylor | B65B 31/045 |
| | | | | 53/511 |
| 2011/0131934 | A1 * | 6/2011 | Bierschenk | B65B 37/18 |
| | | | | 53/523 |

* cited by examiner

VERTICAL PACKAGING MACHINE FOR PACKAGING PRODUCTS AND ASSOCIATED METHOD

CROSS-REFERENCE TO RELATED APPLICATIONS

This application relates to and claims the benefit and priority to European Application No. EP18382103.2, filed Feb. 21, 2018.

TECHNICAL FIELD

The present invention relates to vertical packaging machines for packaging products and to associated methods.

BACKGROUND

Certain types of conventional packaging machines for packaging products, particularly vertical packaging machines, comprise a feeder supplying a continuous film that is wound like a reel. The film is supplied to a vertical forming element which imparts a tubular shape to said film. The machine also comprises a drive device for driving the tubular-shaped film in a descending forward movement direction, around the forming element, and at least one longitudinal sealing tool sealing the longitudinal ends of the tubular-shaped film together, a film tube thereby being generated. The upper part and lower part of the forming element are open.

A machine of this type further comprises a transverse sealing and cutting tool, arranged downstream of the forming element, to generate a transverse seal and a transverse cut on the film tube. After this operation (or operations), a tube closed at one end is obtained upstream of the transverse cut, and a package closed at both ends and physically separated from the film tube is obtained downstream of the transverse cut. During said operation (or operations), the end located farther upstream of the package is closed, whereas the closed end located farther downstream corresponds with the closed end of the film tube of the preceding cycle, i.e., the transverse seal causing the closure of one end of the film tube will become a closed end of the package that is obtained in the next cycle.

The machine also comprises a hopper or a similar device located upstream of the forming element, from where the product to be packaged is introduced into the forming element, which product is arranged on the transverse seal of the film tube closed at one end after falling through the forming element. The product is introduced into the forming element through its upper part and exits through its lower part towards the transverse seal of the film tube. It must be borne in mind that the film tube surrounds the forming element, such that when the product is introduced into the forming element, it is also introduced into the film tube.

The product is supplied in a controlled manner from the hopper (or from upstream of the hopper), with a predetermined amount being supplied each time (if the product is a lettuce-type type product, snack-type product, or the like), or with the unitary product itself, which corresponds with the amount of product to be packaged in each package, being supplied.

Patent document U.S. Pat. No. 6,179,015B1 discloses a machine comprising a forming element and a hopper arranged upstream of the forming element and aligned with said forming element, at least said forming element and said hopper forming a supply conduit through which the product to be supplied falls. The machine further comprises a flow generator with an injection device configured for injecting a gaseous fluid and a distributor for directing said fluid to the supply conduit. The distributor comprises an inlet mouth for receiving the fluid injected by the injection device and an annular outlet mouth arranged in height between a lower mouth of the hopper and an upper mouth of the forming element for introducing said fluid into the supply conduit. The machine further comprises a sensor arranged below the hopper and the annular outlet mouth for detecting the presence of the product to be packaged, and a control device configured for controlling fluid injection depending on said detection, such that the injected fluid accelerates the product downwards to the forming element.

SUMMARY

A first aspect relates to a vertical packaging machine, comprising:
  a forming element with an upper mouth,
  a hopper arranged upstream of the forming element and aligned with said forming element, comprising an upper mouth through which the products to be packaged are introduced, at least the hopper and the forming element forming a vertical supply conduit through which the product to be packaged falls,
  a flow generator comprising an injection device configured for injecting a gaseous fluid and a distributor configured for directing said fluid to the supply conduit, and
  a control device configured for causing the injection device to inject the fluid in a controlled manner.

The distributor comprises at least one inlet mouth communicated with the injection device for receiving the fluid injected by said injection device, and at least one outlet mouth in the supply conduit, which is communicated with the inlet mouth and arranged upstream of the upper mouth of the forming element and downstream of the upper mouth of the hopper, and is configured for causing the injected fluid to be introduced downwards into said supply conduit.

The outlet mouth comprises an area smaller than the area of the inlet mouth, such that when said fluid is introduced into the supply conduit it furthermore causes at least part of the air present in said supply conduit above the outlet mouth to be directed also towards the forming element following the injected fluid. When fluid is injected, it causes the generation of a negative pressure in the supply conduit, above the outlet mouth, and this negative pressure causes a suction to be generated on everything arranged above it to compensate for it, such that the air present in the supply conduit above said negative pressure and the part of the product to be packaged that may be located upstream of said negative pressure (if any) are suctioned. Everything that was suctioned is therefore directed towards the forming element following the injected fluid (pushing everything located in the region in which the negative pressure has been created and everything located above the lower region of the hopper downwards).

The control device is configured for causing the injection device to perform a fluid injection of a specific duration for each product to be packaged in one and the same package, and for causing said injection device to perform each fluid injection such that said injected fluid starts to reach the upper mouth of the forming element before all the product to be packaged in one and the same package has completely passed through the height of the outlet mouth, and finishes reaching the upper mouth of the forming element once all the product has gone through said upper mouth.

In the prior art, in which the fluid is injected once all the product has already passed through the height of the annular outlet mouth, does not allow preventing product blockage upstream of said outlet mouth. This blockage would occur upstream of the sensor, such that the product could not reach the height of said sensor, and fluid injection therefore would not be generated either. Furthermore, due to the configuration of the flow generator and the control device, in the prior art, a negative pressure could not be caused upstream of the annular outlet mouth either for suctioning everything arranged above the annular outlet mouth in the supply conduit, such that the product is pushed downwards into the forming element with said suction.

In addition to the acceleration mentioned above, which has a positive influence on hindering the generation of blockages, it starts to have an influence on the product before it reaches the outlet mouth, which further increases the acceleration with which the product passes said outlet mouth, thus increasing packaging speed and making it even more difficult for the product to form a blockage at said point (and at any other point of the supply conduit).

The invention is particularly advantageous for packaging chopped lettuce leaves, parsley, snacks, for example, and generally for packaging products that usually form blockages between the upper mouth of the hopper and the upper mouth of the forming element, particularly upstream of the outlet mouth.

A second aspect relates to a method for a vertical packaging machine comprising a forming element with an upper mouth, and a hopper arranged upstream of the forming element and aligned with said forming element, comprising an upper mouth through which the products to be packaged are introduced, at least the hopper and the forming element forming a vertical supply conduit through which the product to be packaged falls.

In the method, in order to package a product in a container:
  said product to be packaged is introduced into the supply conduit through the upper mouth of the hopper in a substantially vertical forward movement direction,
  a controlled injection of gaseous fluid, preferably air, into the supply conduit is performed, and
  said injected fluid is caused to reach the supply conduit through a distributor comprising at least one inlet mouth receiving the injected fluid, and at least one outlet mouth made in the supply conduit, which is communicated with the inlet mouth and arranged upstream of the upper mouth of the forming element and downstream of the upper mouth of the hopper, which is configured for causing the injected fluid to be introduced downwards into said supply conduit, and which comprises an area smaller than the inlet mouth.

Such fluid injection causes, in addition to the injected fluid, at least the air present in the supply conduit above the outlet mouth to be directed towards the upper mouth of the forming element when fluid injection is performed.

In the method, in order to package a product in a package, fluid injection of a specific duration for each product to be packaged in one and the same package is furthermore performed, such that said injected fluid starts to reach the upper mouth of the forming element before all the product to be packaged in one and the same package has passed through the height of the outlet mouth, and finishes reaching the upper mouth once all the product has gone through said upper mouth.

The advantages obtained with the method are at least the same as those mentioned for the first aspect of the invention.

These and other advantages and features will become evident in view of the drawings and the detailed description.

DETAILED DESCRIPTION

Figure 1:
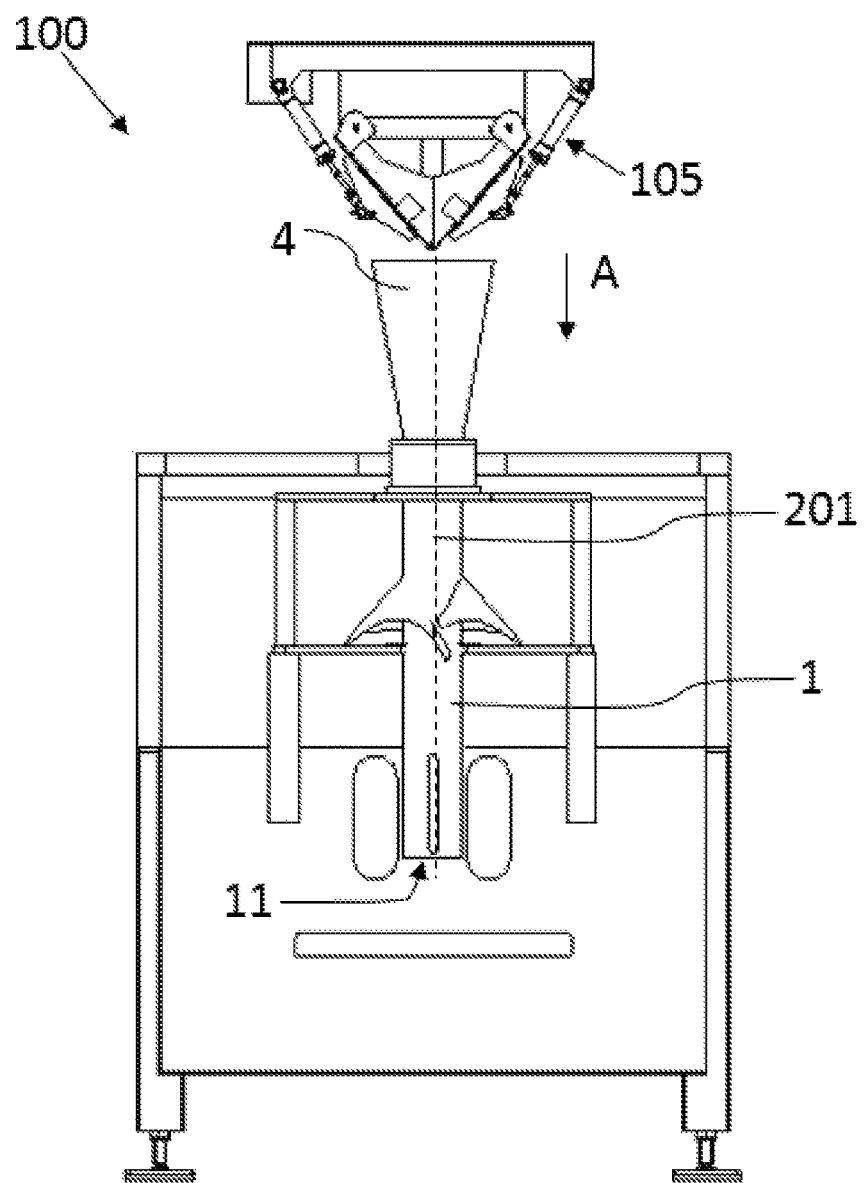
FIG. 1 partially shows an embodiment of a vertical packaging machine.

A first aspect relates to a vertical packaging machine 100, shown partially in FIG. 1, comprising a feeder not shown in Figures, for feeding a continuous film, and a forming element 1, preferably with a cylindrical shape, imparting a tubular shape to the continuous film fed by the feeder. The film from the feeder wraps around the forming element 1, said film thereby acquiring the shape of said forming element 1 (where said tubular shape of the continuous film may comprise a rectangular section, square section, circular section, elliptical section, or a section in other geometric shape). The forming element 1 comprises an upper mouth 10 through which the products to be packaged are introduced into said forming element 1 in a forward movement direction A, and a lower mouth 11 through said products exit said forming element 1.

The machine 100 further comprises a hopper 4 arranged upstream of the forming element 1 and aligned with the forming element 1, at least said hopper 4 and said forming element 1 forming a supply conduit 200 through which the product to be supplied falls, the upper mouth 10 of the forming element 1 being arranged in said supply conduit 200. The hopper 4 comprises an upper mouth 40 through which the products to be packaged are introduced into the supply conduit 200, and a lower mouth 42. The hopper 4 comprises a (preferably conical) decreasing inner perimeter that decreases from the upper mouth 40 to a lower region 41, which in some cases coincides with the lower mouth 42. When they do not coincide, like the case shown in FIG. 2, for example, the hopper 4 comprises an extension from said lower region 41 to the lower mouth 42, having a constant perimeter. The perimeter of the lower mouth 42 and of the lower region 41 is adjusted depending on the perimeter of the upper mouth 10 of the forming element 1, preferably being the same as the perimeter of said upper mouth 10 (unless it is introduced into the forming element 4 like in FIG. 2, for example). When transitioning from a decreasing perimeter to a constant one, a critical region Z is generated for the products as they fall through the supply conduit 200, which can cause a blockage of said products in said critical region Z.

Figure 3:
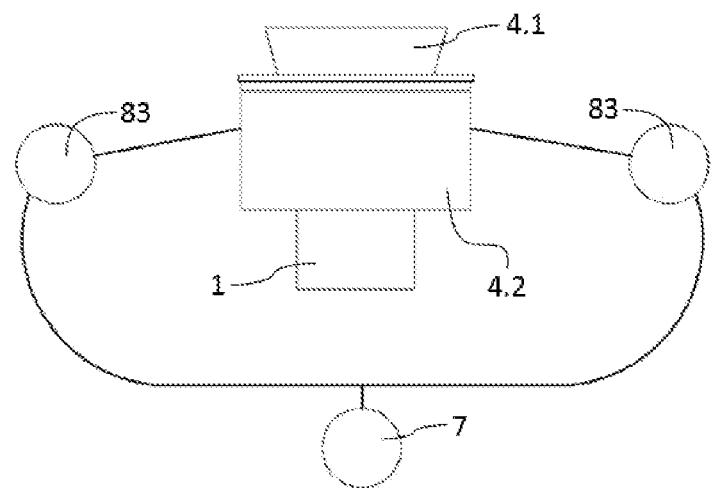
FIG. 3 schematically shows a flow generator of the machine of FIG. 1.

The machine 100 further comprises a flow generator with an injection device 7 shown by way of example in FIG. 3, which is configured for injecting a gaseous fluid, preferably pressurized air, and a distributor 8 configured for directing said fluid to the supply conduit 200, and a control device (not shown in Figures) configured for causing the injection device 7 to inject the fluid in a controlled manner. During injection of a gaseous fluid, the flow generator causes the fluid stream through the supply conduit 200 to become greater, making it difficult for blockages to be generated in the critical region Z described above and at any other point of the supply conduit 200. The injection device 7 may comprise a compressor, a pump, or a similar device.

The distributor 8 comprises at least one inlet mouth 80, communicated with the injection device 7 for receiving the fluid injected by said injection device 7, and at least one outlet mouth 81 in the supply conduit 200 (located at a specific height in the supply conduit 200), which is communicated with the inlet mouth 80 and arranged upstream of the upper mouth 10 of the forming element 1 and downstream of the upper mouth 40 of the hopper 4, and which is configured for causing the injected fluid to be introduced downwards into said supply conduit 200.

The sum of the area of the one or more outlet mouths 81 comprises an area smaller than the sum of the area of the one or more inlet mouths 80, and as a result thereof, the speed of the fluid injected by the injection device 7 increases as it goes through the outlet mouths 81, such that when said fluid is introduced into the supply conduit 200 through the one or more outlet mouths 81, it furthermore causes at least part of the air present in the supply conduit 200 above said outlet mouth 81 to be directed also towards the forming element 1 following the injected fluid due to the Venturi effect and the Coanda effect generated by said injected fluid in the supply conduit 200. If the distributor 8 comprises a plurality of outlet mouths 81 and/or a plurality of inlet mouths 80, the sum of the areas of all the outlet mouths 81 is smaller than the sum of the area of the inlet mouths 80.

The distributor 8 preferably comprises a plurality of outlet mouths 81 and the supply conduit 200 comprises a longitudinal axis 201 which coincides with the longitudinal axis of the forming element 1 and with the longitudinal axis of the hopper 4, and is preferably vertical. The outlet mouths 81 of the distributor 8 are distributed around the longitudinal axis 201 of the supply conduit 200, preferably in a uniform manner. Furthermore, the outlet mouths 81 are preferably distributed around said longitudinal axis 201 along a plane defining a specific angle with respect to said longitudinal axis 201, said angle preferably being equal to 90°.

The control device is configured for causing the injection device 7 to perform a fluid injection of a specific duration for each product to be packaged in one and the same package, and for causing said injection device 7 to perform each fluid injection such that said injected fluid starts to reach the upper mouth 10 of the forming element 1 before all the product to be packaged in one and the same package has passed through the height of the outlet mouth 81 of the distributor, and finishes reaching the upper mouth 10 of the forming element 1 once all the product has gone through said upper mouth 10.

To supply a product to be packaged, said product must be supplied to the hopper 4 through its upper mouth 40, and it falls through the inside of said hopper 4 entering the forming element 1 through its upper mouth 10. The products are supplied to the hopper 4 from a known, specific point of origin (a conventional supply device 105, such as the multi-head device partially shown in FIG. 1, or other devices can be used). Since the structure and configuration of the machine 100 is known, the time it takes for the product to fall to the upper mouth 10 of said forming element 1 can also be known. Preferably, to determine whether or not all the product to be packaged in one and the same package has gone through said upper mouth 10, the moment the product is supplied and the time that the product should take to reach said upper mouth 10 as it falls through the supply conduit 200 due to the effect of gravity are taken into account.

As discussed above, as a result of the configuration of the distributor 8 and of the control device, a negative pressure is generated in the supply conduit 200 upstream of the outlet mouths 81, thereby causing a suction to be generated on everything arranged above the outlet mouths 81 to compensate for said negative pressure. On one hand, this causes everything arranged in the supply conduit 200 above the outlet mouths 81 to be forced towards the forming element 1, and on the other hand, it causes everything arranged at the height of said outlet mouths 81 or below same to be pushed towards said forming element 1, or if it is already in the forming element 1, to be pushed towards the lower mouth 11 of said forming element 1. Everything arranged in the critical region Z described above is thereby affected by one of these two phenomena, making it difficult for blockages to be generated, or if a blockage has already occurred before the injection of the fluid, making it easier to remove the blockage in a more efficient manner.

The flow generator preferably further comprises a selection device for preventing communication between the injection device 7 and at least a first outlet mouth 81 and at least a second outlet mouth 81 in an independent and selective manner. The selection device can comprise, for example, a respective electrically-controlled ON/OFF-type valve 83 for each outlet mouth 81. The distributor preferably comprises a first inlet mouth 80 communicated with the first outlet mouth 81, and a second inlet mouth 80 communicated with the second outlet mouth 81, the selection device being arranged between the injection device 7 and said inlet mouths 80. The distributor 8 can comprise a first inlet mouth 80 communicated with a plurality of outlet mouths 81, and a second inlet mouth 80 communicated with another plurality of different outlet mouths 81.

The control device is communicated with the selection device and configured for causing the actuation of said selection device in a controlled manner (for example, controlling in this way the mouth and closing of the corresponding valve 83). The control device is configured for acting on the selection device such that during the injection of gaseous fluid associated with a product to be packaged in one and the same package, the injected fluid reaches the first outlet mouth 81 before the second outlet mouth 81 or vice versa. The flow generator therefore causes an actuation first on one region of the product rather than on the rest of the product (with the injected fluid and the corresponding additional air), and then on all the product, assuring to an even greater extent that said product does not form a blockage (and if it does, assuring that the blockage is removed in a more efficient manner). The additional air which is introduced into the forming element 1 due to fluid injection is introduced following the injected fluid, so it tends to go towards the region of the corresponding forming element 1 (with the first injection).

Figure 2:
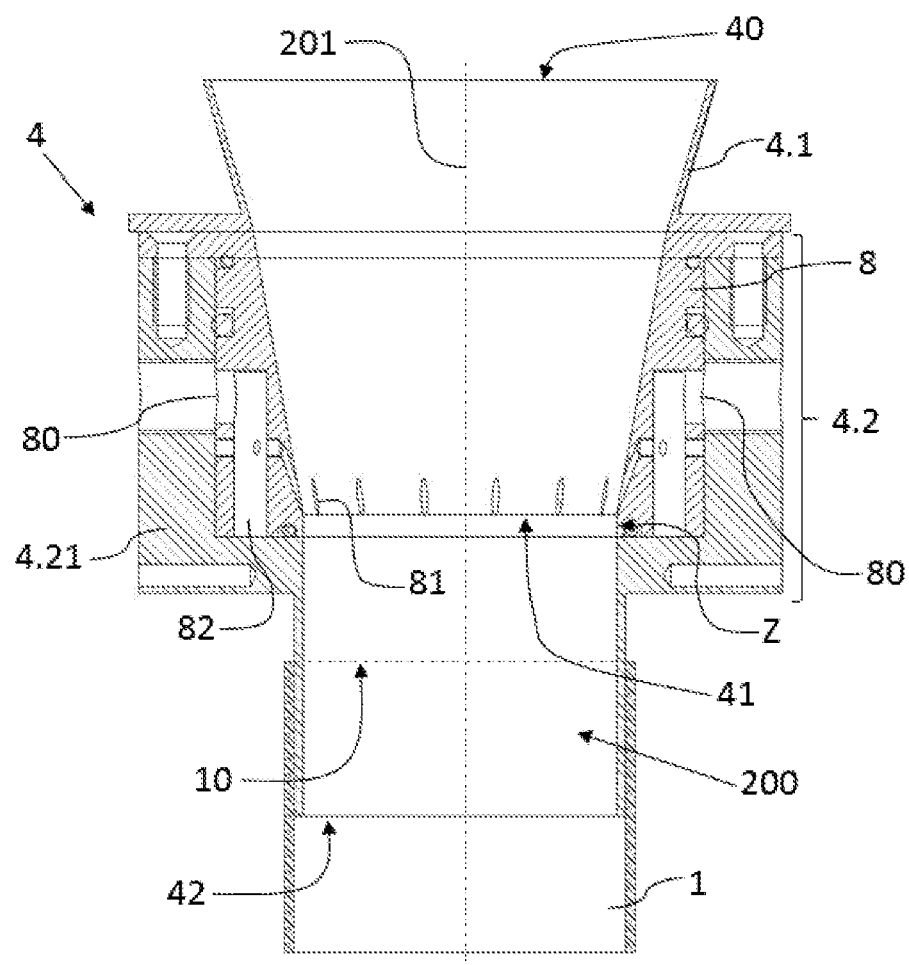
FIG. 2 shows a section view of the hopper and, partially, of the forming element of the machine of FIG. 1.

In some embodiments, the outlet mouth 81 of the distributor 8 is a through hole made in the hopper 4, preferably above the critical region Z, the supply conduit 200 communicating with the injection device 7 through said through hole. In some of these embodiments, as shown by way of example in FIG. 2, the hopper 4 is formed by a first segment 4.1 comprising the upper mouth 40 of said hopper 4 and a second segment 4.2 arranged downstream of the first segment 4.1 and attached to said first segment 4.1. The second segment 4.2 comprises the outlet mouths 81 of the distributor 8 which, as seen in FIG. 2, are arranged above the critical region Z.

The second segment 4.2 can comprise the distributor 8, and a support 4.21 attached to the distributor 8. The distributor 8 comprises a housing with inlet mouths 80 and outlet mouths 81, and the support 4.21 covers the exposed part of the distributor, closing the housing, such that a chamber 82 with the inlet mouths 80 and outlet mouths 81 is demarcated between the distributor 8 and the support 4.21. The support 4.21 further comprises a passage or conduit communicating the injection device 7 with the inlet mouths 80 (preferably one conduit for each inlet mouth 80). The injection device 7 is communicated with the inlet of the conduits of the support 4.21, and the selection device is arranged between said injection device 7 and said support 4.21.

The main function of the support 4.21 of the first embodiment is to close the chamber 82 of the distributor 8 at the lower part thereof, but in other embodiments not shown in the figures, this can be achieved by means of a similar cap, so said support 4.21 is not necessary. In such embodiments, the second segment 4.2 is therefore formed by the distributor 8 and a cap or the like. The chamber 82 may be included as part of the distributor 8.

In other embodiments, the second element 4.2 of the hopper 4 that has been described would be the distributor 8 itself, and would be arranged between the hopper 4 (which would be formed only by the first element 4.1) and the forming element 1, forming said hopper 4.

Figure 4:
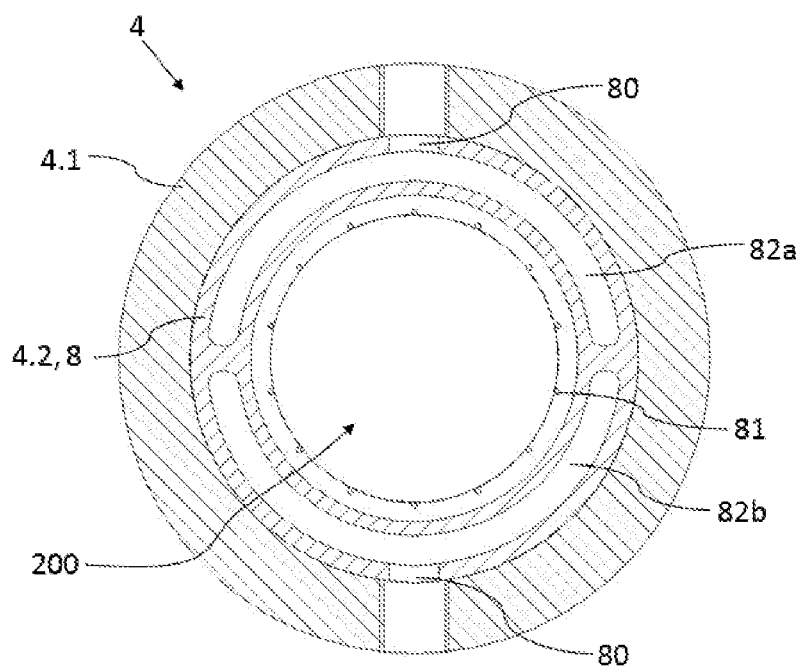
FIG. 4 is a section plan view of the hopper of FIG. 2.

In any of the embodiments, the chamber 82 can be divided into at least two independent half chambers 82*a* and 82*b*, as shown by way of example in FIG. 4, each half chamber 82*a* and 82*b* preferably comprising an inlet mouth 80 and at least one outlet mouth 81. The distributor 8 therefore comprises at least two outlet mouths 81 and at least two inlet mouths 80, and the chamber 82 of the distributor 8 is divided into at least two half chambers 82*a*, 82*b*, each half chamber 82*a*, 82*b* being communicated with at least one corresponding outlet mouth 81 and with a corresponding inlet mouth 80, and the injection device 7 being communicated with said half chambers 82*a*, 82*b* through the corresponding inlet mouth 80. According to one embodiment the chamber 82 is divided into two independent half chambers 82*a* and 82*b*, each half chamber 82*a* and 82*b* preferably comprising an inlet mouth 80 and at least one corresponding outlet mouth 81. Both half chambers 82*a* and 82*b* being independent means that when a fluid is injected to one of them, said fluid reaches the inside of the hopper 4 from said half chamber 82*a* or 82*b* but not through the other half chamber 82*a* or 82*b*. So by means of a suitable action on the selection device, the action on different regions of the product to be packaged can be caused with fluid injection, as explained above.

As also described above, the injection of the fluid into the supply conduit 200 through the outlet mouths 81 causes the air to be suctioned from the part of the supply conduit 200 arranged upstream of said outlet mouths 81 to the forming element 1. This entails an increase in the volume of the fluid circulating through the forming element 1, which must be discharged from the forming element 1 so that it is not introduced into the package to be generated. If holes were made in the forming element 1 as proposed in the prior art for extracting said fluid, it would be necessary to apply suction on these holes to draw said fluid, and due to the suction force necessary (due to the need to extract not only the injected fluid, but also the air that is drawn due to the negative pressure generated), the product falling through said forming element 1 would also be drawn towards said holes, blocking them. If these holes are blocked, the fluid could not be discharged from the forming element 1 and could break the film.

Figure 5:
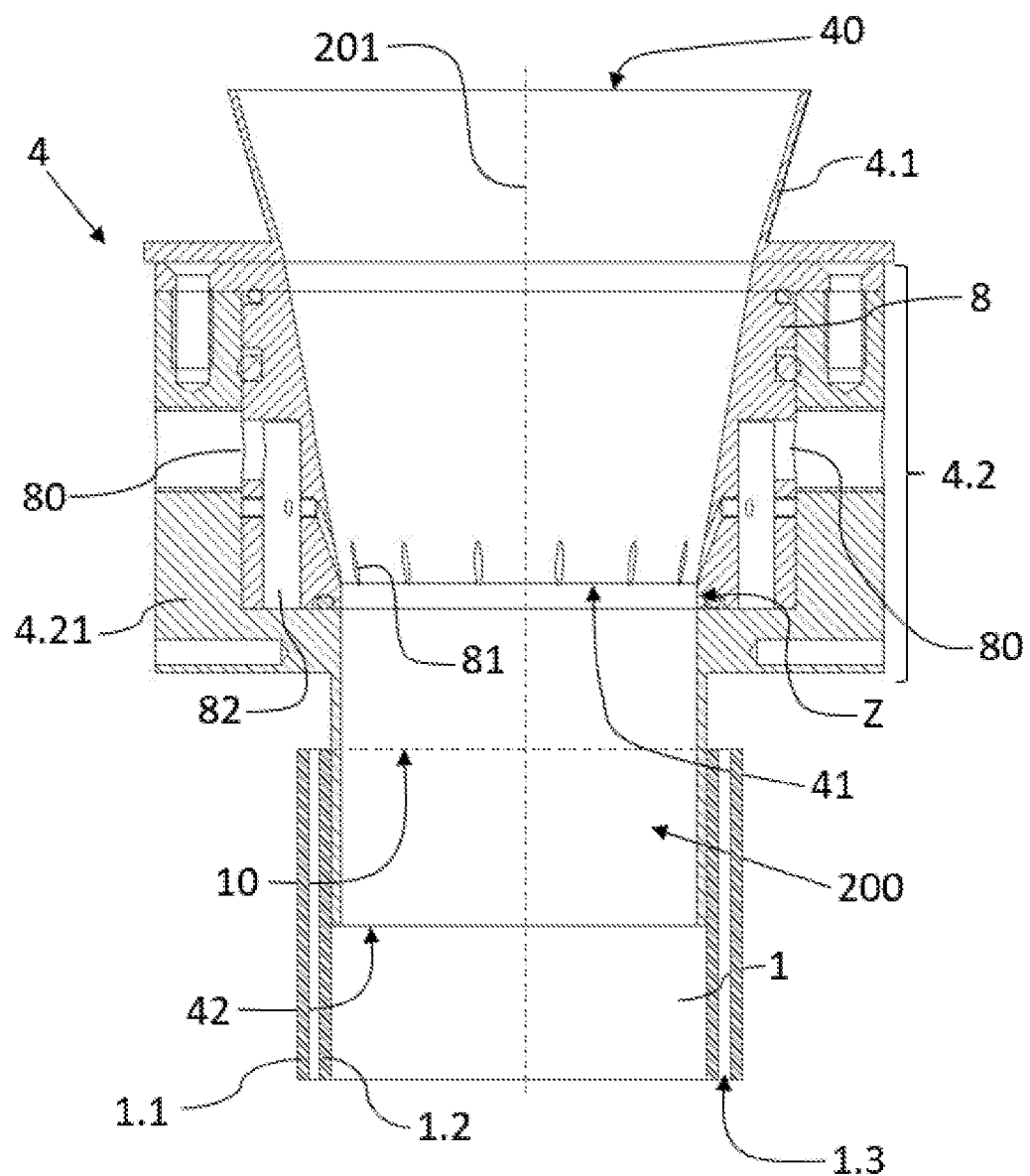
FIG. 5 shows a section view of the hopper and, partially, of the forming element of the machine of FIG. 1, according to another embodiment.

In some embodiments, as shown in FIG. 5, the forming element 1 is formed by two concentric elements 1.1 and 1.2 with a gap 1.3 between the concentric elements. The inner element 1.2 is configured for receiving the products to be packaged and comprises the upper mouth 10 of the forming element 1, and the outer element 1.1 is configured for forming the continuous film, surrounding it. The gap 1.3 is communicated with the outside of the forming element 1 at the upper part thereof and with the lower mouth 11 of the forming element 1 at the lower part thereof to allow the fluid and air introduced into the forming element 1 through its upper mouth 10 to exit therethrough. Said fluid and air are therefore provided with an outflow path without any risk of said path being blocked by the products, said fluids and air being safely extracted.

In other embodiments, the continuous film itself comprises holes, perforations, or micro-perforations, making the exit of the injected gaseous fluid and air introduced into the forming element 1 easier.

A second aspect relates to a method for a vertical packaging machine, such as, for example, the machine of the first aspect (in any of its configurations and/or embodiments).

In the method, in order to package a product in a package, said product to be packaged is introduced into the supply conduit 200 through the upper mouth 40 of the hopper 4 in a substantially vertical forward movement direction A, and a controlled injection of gaseous fluid into the supply conduit 200 is performed.

In the method, in order to package a product in a package, said injected fluid is furthermore caused to reach the supply conduit 200 through the distributor 8, as discussed above, causing, in addition to the injected fluid, at least the air present in the supply conduit 200 above the outlet mouth 81 of the distributor 8 to be directed towards the upper mouth 10 of the forming element 1 when fluid injection is performed.

In the method, fluid injection of a specific duration for each product to be packaged in one and the same package is performed, such that said injected fluid starts to reach the upper mouth 10 of the forming element 1 before all the product to be packaged in one and the same package has passed through the height of the outlet mouth 81, and finishes reaching the upper mouth 10 once all the product has gone through said upper mouth.

The fluid is preferably injected into the forming element 1 through at least a first outlet mouth 81 and a second outlet mouth 81, causing, during fluid injection for a product to be packaged in one and the same package, the fluid to start to be introduced into the forming element 1 through one of said outlet mouths 81 before through the other outlet mouth 81. Fluid injection is preferably interrupted at both outlet mouths 81 simultaneously.

All the features described in relation to the machine 100 of the first aspect are also understood as being described for the method of the second aspect.

The following clauses disclose in an unlimited way additional embodiments.

Clause 1. A vertical packaging machine for packaging products, the vertical packaging machine comprising:
  a forming element (1) with an upper mouth (10);
  a hopper (4) which is arranged upstream of the forming element (1) and aligned with said forming element (1) and comprises an upper mouth (40) through which the products to be packaged are introduced, at least the hopper (4) and the forming element (1) forming a vertical supply conduit (200) through which the product to be packaged falls;
a flow generator comprising an injection device (7) configured for injecting a gaseous fluid and a distributor (8) configured for directing said fluid to the supply conduit (200); and
a control device configured for causing the injection device (7) to inject the fluid in a controlled manner,
the distributor (8) comprising at least one inlet mouth (80) communicated with the injection device (7) for receiving the fluid injected by said injection device (7), and at least one outlet mouth (81) in the supply conduit (200), which is communicated with the inlet mouth (80) and arranged upstream of the upper mouth (10) of the forming element (1) and downstream of the upper mouth (40) of the hopper (4), and which is configured for causing the injected fluid to be introduced downwards into said supply conduit (200), the outlet mouth (81) comprises an area smaller than the area of the inlet mouth (80), such that when said fluid is introduced into the supply conduit (200) it furthermore causes at least part of the air present in said supply conduit above the outlet mouth to be directed also towards the forming element (1) following the injected fluid, the control device being configured for causing the injection device (7) to perform fluid injection of a specific duration for each product to be packaged in one and the same package, and for causing said injection device (7) to perform each fluid injection such that said injected fluid starts to reach the upper mouth (10) of the forming element (1) before all the product to be packaged in one and the same package has completely passed through the height of the outlet mouth (81) and finishes reaching the upper mouth (10) of the forming element (1) once all the product has gone through said upper mouth (10).

Clause 2. The packaging machine according to clause 1, wherein the distributor comprises a plurality of outlet mouths (81) and one or more inlet mouths (80), the sum of all the areas of the inlet mouths (80) being larger than the sum of all the areas of the outlet mouths (81).

Clause 3. The packaging machine according to clause 2, wherein the supply conduit (200) comprises a longitudinal axis (201) coinciding with the longitudinal axis (11) of the forming element (1) and with the longitudinal axis of the hopper (4), the outlet mouths (81) being distributed around said longitudinal axis (201), preferably in a uniform manner.

Clause 4. The packaging machine according to clause 2 or 3, wherein the outlet mouths (81) are distributed around the longitudinal axis (201) of the supply conduit (200), along a plane defining an angle with respect to said longitudinal axis (201), said plane preferably comprising an angle equal to 90° with respect to said longitudinal axis (201).

Clause 5. The packaging machine according to any of clauses 2 to 4, wherein the flow generator comprises a selection device for preventing communication between the injection device (7) and at least a first outlet mouth (81) and a second outlet mouth (81) in an independent and selective manner, the control device being communicated with said selection device and configured for causing the actuation of said selection device in a controlled manner.

Clause 6. The packaging machine according to clause 5, wherein the control device is configured for acting on the selection device such that, during the injection of gaseous fluid associated with a product to be packaged in one and the same package, the injected fluid reaches the first outlet mouth (81) before the second outlet mouth (81) or vice versa.

Clause 7. The packaging machine according to any of clauses 1 to 6, wherein the distributor (8) is arranged between the hopper (4) and the forming element (1), the supply conduit (200) being formed at least by said hopper (4), said distributor (8), and said forming element (1).

Clause 8. The packaging machine according to any of clauses 1 to 6, wherein each outlet mouth (81) is a through hole made in the hopper (4), the supply conduit (200) communicating with the injection device (7) through said through hole.

Clause 9. Packaging machine according to claim 8, wherein the hopper (4) is formed by a first segment (4.1) comprising the upper mouth (40) of said hopper (4), and a second element (4.2) arranged at least partially downstream of the first segment (4.1), said second element (4.2) comprising the outlet mouths (81) of the distributor (8).

Clause 10. The packaging machine according to clause 9, wherein the distributor (8) comprises a chamber (82) communicating the inlet mouth (80) with the outlet mouths (81) of the distributor (8).

Clause 11. The packaging machine according to clause 10, wherein the distributor (8) comprises at least two outlet mouths (81) and at least two inlet mouths (80), and the chamber (82) of the distributor (8) is divided into at least two half chambers (82a, 82b), each half chamber (82a, 82b) being communicated with at least one corresponding outlet mouth (81) and with a corresponding inlet mouth (80), and the injection device (7) being communicated with said half chambers (82a, 82b) through the corresponding inlet mouth (80).

Clause 12. The packaging machine according to any of clauses 1 to 11, wherein the forming element (1) is formed by two concentric elements with a gap between both concentric elements, the inner element being configured for receiving the products to be packaged and said inner element comprising the upper mouth (10) of the forming element (1), the outer element being configured for forming the continuous film, and the gap being communicated with the outside of the forming element (1) to allow the fluid and the air introduced into said forming element (1) through said upper mouth (10) to exit therethrough.

Clause 13. A method for a vertical packaging machine comprising a forming element (1) with an upper mouth (10), and a hopper (4) arranged upstream of the forming element (1) and aligned with said forming element (1), comprising an upper mouth (40) through which the products to be packaged are introduced, at least the hopper (4) and the forming element (1) forming a vertical supply conduit (200) through which the product to be packaged falls, wherein, in the method, in order to package a product in a package, said product to be packaged is introduced into the supply conduit (200) through the upper mouth (40) of the hopper (4) in a substantially vertical forward movement direction (A), and a controlled injection of gaseous fluid into the supply conduit (200) is performed, in the method
said injected fluid is caused to reach the supply conduit (200) through a distributor (8) comprising at least one inlet mouth (80) which receives the injected fluid, and at least one outlet mouth (81) made in the supply conduit (200), which is communicated with the inlet mouth (80) and arranged upstream of the upper mouth (10) of the forming element (1) and downstream of the upper mouth (40) of the hopper (4), which is configured for causing the injected fluid to be introduced downward into said supply conduit (200), and which comprises an area smaller than the inlet mouth (80), causing, in addition to the injected fluid, at least the air present in the supply conduit (200) above the outlet mouth (81) to be directed towards the upper mouth (10) of the forming element (1) when fluid injection is performed, and the fluid injection of a specific duration for each product to be packaged in one and the same package is performed such that said injected fluid starts to reach the upper mouth (10) of the forming element (1) before all the product to be packaged in one and the same package has passed through the height of the outlet mouth (81), and finishes reaching the upper mouth (10) once all the product has gone through said upper mouth (10).

Clause 14. The method according to clause 13, wherein the fluid is introduced into the supply conduit (200) through at least a first outlet mouth (81) and at least a second outlet mouth (81), causing, during fluid injection for a product to be packaged in one and the same package, the fluid to start to be introduced into the supply conduit (200) through one of the outlet mouths (81) before through the other outlet mouth (81).

What is claimed is:

1. A vertical packaging machine for packaging products, the vertical packaging machine comprising:
    a forming element having an upper mouth;
    a hopper that is at least partially arranged above the forming element, the hopper including an upper mouth through which the products to be packaged are introduced, at least the hopper and the forming element forming a vertical supply conduit through which the product to be packaged falls;
    an injection device configured to produce a gaseous fluid flow;
    a distributor configured to direct the gaseous fluid flow into the supply conduit, the distributor including an inlet mouth and an outlet mouth, the inlet mouth being disposed between and in fluid communication with the injection device and the outlet mouth, the outlet mouth being located at a height in the supply conduit upstream of the upper mouth of the forming element and downstream the upper mouth of the hopper, the outlet mouth being configured to direct the gaseous fluid flow downwards into the supply conduit, the inlet and outlet mouths respectively comprising a first flow path area and a second flow path area, the second flow path area being smaller than the first flow path area such that when the gaseous fluid flow is introduced into the supply conduit air present in the supply conduit above the outlet mouth is also directed towards the forming element following the gaseous fluid flow;
    a control device that is operatively connected to the injection device and configured to cause the injection device to produce the gaseous fluid flow for a specific time period for each product to be packaged in one and the same package, the specific time period being selected such that the gaseous fluid flow starts to reach the upper mouth of the forming element before all the product to be packaged in one and the same package has completely passed through the height of the outlet mouth and finishes reaching the upper mouth of the forming element once all the product has gone through the upper mouth.

2. The vertical packaging machine according to claim 1, wherein the distributor includes one or more inlet mouths that collectively have the first flow path area and a plurality of outlet mouths that collectively have the second flow path area, the first flow path area being greater than the second flow path area.

3. The vertical packaging machine according to claim 2, wherein the supply conduit includes a longitudinal axis coinciding with a longitudinal axis of the forming element and with a longitudinal axis of the hopper, the plurality of outlet mouths being distributed around the longitudinal axis of the supply conduit.

4. The vertical packaging machine according to claim 3, wherein the plurality of outlet mouths are distributed around the longitudinal axis of the supply conduit in a uniform manner.

5. The vertical packaging machine according to claim 4, wherein the plurality of outlet mouths are distributed around the longitudinal axis of the supply conduit in a horizontal plane.

6. The vertical packaging machine according to claim 4, wherein the plurality of outlet mouths are distributed around the longitudinal axis of the supply conduit in a plane inclined with respect to the longitudinal axis of the supply conduit.

7. The vertical packaging machine according to claim 2, wherein the distributor includes first and second inlet mouths and first and second outlet mouths, the packaging machine further comprising first and second flow control valves, the first flow control valve located between the injection device and the first inlet mouth, the second flow control valve located between the injection device and the second inlet mouth, each of the first and second flow control devices having an open position and a closed position, the first and second flow control valves being operatively controlled by the control device.

8. The vertical packaging machine according to claim 7, wherein the control device is configured to cause the first flow control valve to assume the open position while maintaining the second flow control valve in the closed position.

9. The vertical packaging machine according to claim 8, wherein the control device is configured to cause the second flow control valve to assume the open position while maintaining the first flow control valve in the closed position.

10. The vertical packaging machine according to claim 7, wherein the control device is configured to cause the first and second flow control valves to sequentially open when the gaseous fluid flow is established by the injection device, the first flow control device being caused to assume the open position before the second flow control valve assumes the open position.

11. The vertical packaging machine according to claim 10, wherein the control device is configured to sequentially open the first and second flow control valves in a manner that results in the gaseous fluid flow to reach the first outlet mouth before the second outlet mouth.

12. The vertical packaging machine according to claim 1, wherein the distributor is arranged between the hopper and the forming element, the supply conduit being formed at least by the hopper, the distributor and the forming element.

13. The vertical packaging machine according to claim 1, wherein the outlet mouth is a through hole made in the hopper, the supply conduit communicating with the injection device through the through hole.

14. The packaging machine according to claim 13, wherein the hopper is formed by a first segment that includes the upper mouth of the hopper, and a second segment arranged at least partially below the first segment, the outlet mouth of the distributor being located inside the second segment.

15. The vertical packaging machine according to claim 14, wherein the distributor comprises a chamber communicating the inlet mouth with the outlet mouth.

16. The vertical packaging machine according to claim 14, wherein the distributor includes at least first and second outlet mouths and at least first and second inlet mouths, and the chamber of the distributor is divided into at least first and second sub-chambers, the first sub-chamber communicating the first inlet mouth with the first outlet mouth, the second sub-chamber communicating the second inlet mouth with the second outlet mouth.

17. The vertical packaging machine according to claim 1, wherein the forming element is formed by two concentric elements with a gap between both concentric elements, the two concentric elements including an inner element and an outer element, the inner element being configured to receive the products to be packaged, the inner element including the upper mouth of the forming element, the outer element being configured for forming a package from a film of material, and the gap being communicated with the outside of the forming element to allow the gaseous fluid and the air introduced into the forming element through the upper mouth to exit there through.

18. A method for introducing a product inside a package formed by a forming element of a vertical packaging machine, the forming element having an upper mouth, the vertical packaging machine further including a hopper having an upper mouth through which the product to be packaged is introduced, at least a portion of the hopper is arranged above and aligned with the forming element, at least the hopper and the forming element forming a vertical supply conduit through which the product to be packaged falls, the method comprising;

introducing the product in the upper mouth of the hopper so that the product moves in a forward downward direction toward the forming element;

injecting a gaseous fluid into the supply conduit, the gaseous fluid being directed to the supply conduit by a distributor that includes at least one inlet mouth through which the gaseous fluid enters the distributor and at least one outlet mouth made in the supply conduit, the outlet mouth being in fluid communication with the inlet mouth and arranged at a height above the upper mouth of the forming element and below the upper mouth of the hopper, the outlet mouth being arranged to cause the gaseous fluid to be directed downward into the supply conduit, the inlet mouth has a first flow path area and the outlet mouth has a second flow path area, the second flow path area being smaller than the first flow path area, the gaseous fluid being introduced downward into the supply conduit in a manner that causes air present in the supply conduit above the outlet mouth to be directed towards the upper mouth of the forming element, the injection of the gaseous fluid being for a specific period of time for each product to be packaged in one and the same package such that the gaseous fluid starts to reach the upper mouth of the forming element before all the product to be packaged in one and the same package has passed through the height of the outlet mouth, and finishes reaching the upper mouth of the forming element once all the product has gone through the upper mouth of the forming element.

19. The method according to claim 18, wherein the distributor includes first and second inlet mouths that are respectively in fluid communication with first and second outlet mouths, the gaseous fluid being directed through the first and second inlet mouths in a manner that causes the gaseous fluid to reach the first outlet mouth before the second outlet mouth.

* * * * *